United States Patent
Haidar

(10) Patent No.: US 12,516,875 B2
(45) Date of Patent: Jan. 6, 2026

(54) APPLIANCE AND METHOD FOR APPLIANCE DIAGNOSTICS

(71) Applicant: Haier US Appliance Solutions, Inc., Wilmington, DE (US)

(72) Inventor: Omar Haidar, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 150 days.

(21) Appl. No.: 18/587,384

(22) Filed: Feb. 26, 2024

(65) Prior Publication Data
US 2025/0271205 A1 Aug. 28, 2025

(51) Int. Cl.
F25D 29/00 (2006.01)

(52) U.S. Cl.
CPC ......... F25D 29/006 (2013.01); F25D 29/005 (2013.01); *F25D 2700/00* (2013.01)

(58) Field of Classification Search
CPC ... F25D 2700/00; F25D 29/005; F25D 29/006
See application file for complete search history.

(56) References Cited

U.S. PATENT DOCUMENTS

| | | | |
|---|---|---|---|
| 9,772,136 B2 | 9/2017 | Shim et al. | |
| 11,614,278 B2* | 3/2023 | Han | G05B 13/0265 |
| | | | 702/183 |
| 2005/0028034 A1* | 2/2005 | Gantman | G06F 11/0793 |
| | | | 714/E11.023 |
| 2010/0269522 A1* | 10/2010 | Schwarz | F25B 49/005 |
| | | | 62/115 |
| 2011/0000100 A1* | 1/2011 | Malcher | D06F 58/52 |
| | | | 34/108 |
| 2014/0313006 A1* | 10/2014 | Mason | H05B 47/10 |
| | | | 340/6.1 |

(Continued)

FOREIGN PATENT DOCUMENTS

| | | |
|---|---|---|
| JP | 4265982 B2 | 5/2009 |
| JP | 2010532021 A | 9/2010 |
| JP | 2016007800 A | 1/2016 |

(Continued)

*Primary Examiner* — Henry T Crenshaw
(74) *Attorney, Agent, or Firm* — Dority & Manning, P.A.

(57) ABSTRACT

An appliance and method for appliance diagnostics is provided. The appliance includes a controller configured to cause the appliance to perform operations. The operations include obtaining an ambient acoustic signal external to the appliance; performing a diagnostic routine, wherein the diagnostic routine commands an activated state of one or more appliance components of the plurality of appliance components, and wherein the diagnostic routine commands a deactivated state of a remaining one or more appliance components; obtaining a current-state acoustic signal relative to the plurality of appliance components commanded to the activated state; generating a current-state spectrogram from the current-state acoustic signal; determining an operating condition of the plurality of appliance components commanded to the activated state based at least on comparing the current-state spectrogram to a baseline spectrogram corresponding to activated appliance component; and generating a communication signal based on the determined operating condition of the plurality of appliance components.

20 Claims, 7 Drawing Sheets

(56) References Cited

U.S. PATENT DOCUMENTS

| | | | |
|---|---|---|---|
| 2017/0268924 A1* | 9/2017 | Shin | G01V 8/10 |
| 2021/0217439 A1* | 7/2021 | Shimada | G06N 3/08 |

FOREIGN PATENT DOCUMENTS

| | | | |
|---|---|---|---|
| JP | 2017219243 A | 12/2017 |
| KR | 20100031696 A | 3/2010 |
| WO | WO2022111773 A1 | 6/2022 |

* cited by examiner

APPLIANCE AND METHOD FOR APPLIANCE DIAGNOSTICS

FIELD OF THE INVENTION

The present disclosure is related generally to appliances, and more particularly to systems and methods for self-diagnostics at an appliance.

BACKGROUND OF THE INVENTION

Appliances, such as refrigerator appliances, may experience losses or degradation in performance over time or due to various types of usage. A user may request for a service technician to determine, diagnose, and fix an issue at the appliance. However, service technicians may become busy and be unable to attend to the user's appliance as quickly as desired by the user. Furthermore, some issues at the appliance may be determinable and resolvable by the user. However, systems and methods facilitating diagnostics at the appliance may be unavailable to the user.

As such, there is a need for improved appliances and methods for diagnostics at appliances.

BRIEF DESCRIPTION OF THE INVENTION

Aspects and advantages of the invention will be set forth in part in the following description, or may be apparent from the description, or may be learned through practice of the invention.

An aspect of the present disclosure is directed to an appliance including a plurality of appliance components, and an acoustic sensor configured to obtain an acoustic signal relative to the plurality of appliance components. A controller is operably coupled to the plurality of appliance components and configured to receive the acoustic signal from the acoustic sensor. The controller is configured to execute instructions that causes the appliance to perform operations. The operations include obtaining a user control signal to perform a diagnostic routine; obtaining an ambient acoustic signal external to the appliance; performing the diagnostic routine, wherein the diagnostic routine commands an activated state of one or more appliance components of the plurality of appliance components, and wherein the diagnostic routine commands a deactivated state of a remaining one or more appliance components; obtaining a current-state acoustic signal relative to the plurality of appliance components commanded to the activated state; generating a current-state spectrogram from the current-state acoustic signal; determining an operating condition of the plurality of appliance components commanded to the activated state based at least on comparing the current-state spectrogram to a baseline spectrogram corresponding to activated appliance component; and generating a communication signal based on the determined operating condition of the plurality of appliance components.

Another aspect of the present disclosure is directed to a computer-implemented method for appliance diagnostics. The method includes obtaining a user control signal to perform a diagnostic routine; obtaining an ambient acoustic signal external to the appliance; performing the diagnostic routine, wherein the diagnostic routine commands an activated state of one or more appliance components of the plurality of appliance components, and wherein the diagnostic routine commands a deactivated state of a remaining one or more appliance components; obtaining a current-state acoustic signal relative to the plurality of appliance components commanded to the activated state; generating a current-state spectrogram from the current-state acoustic signal; determining an operating condition of the plurality of appliance components commanded to the activated state based at least on comparing the current-state spectrogram to a baseline spectrogram corresponding to activated appliance component; and generating a communication signal based on the determined operating condition of the plurality of appliance components.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
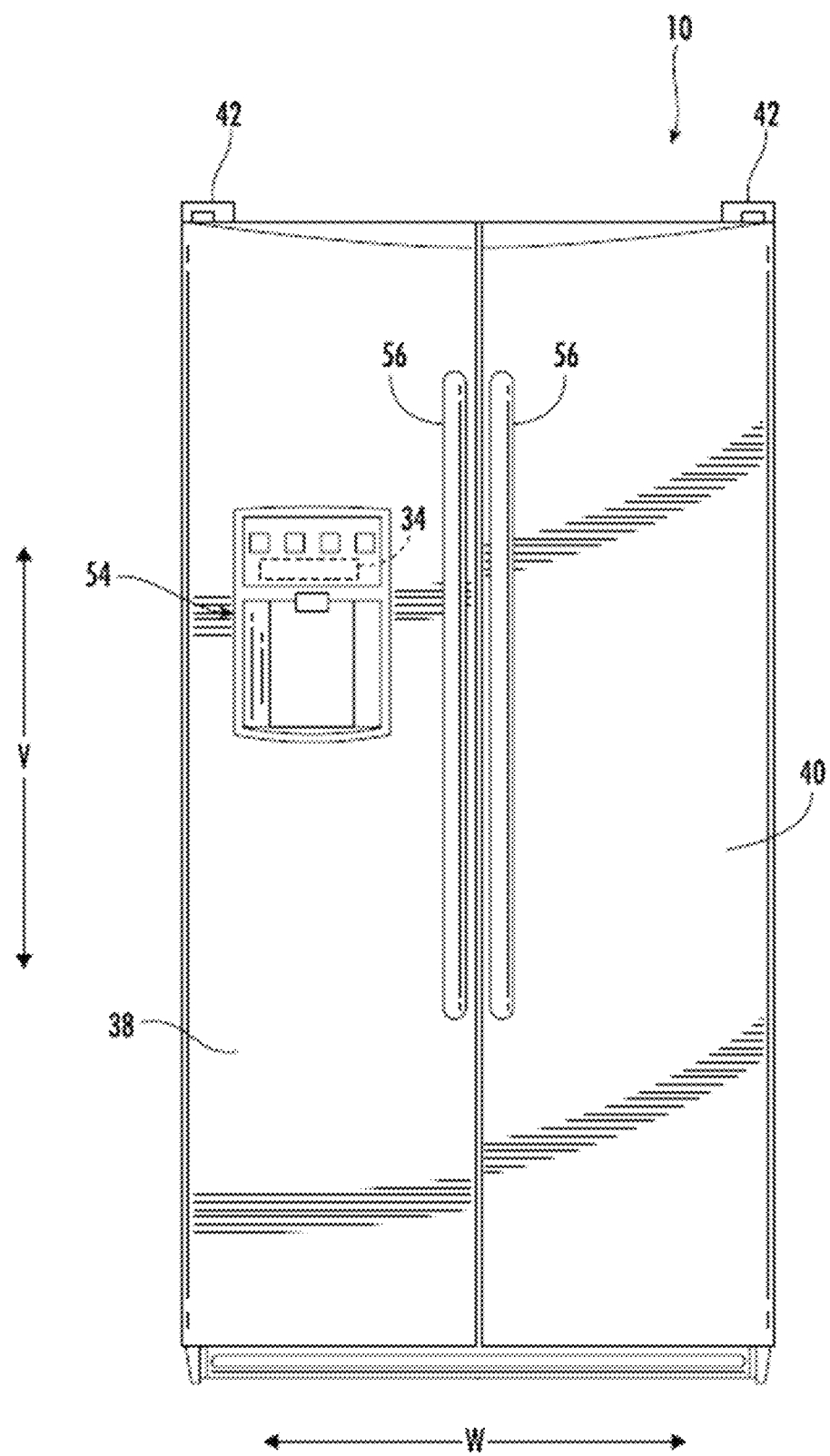
FIG. 1 is a perspective view of a refrigerator appliance according to an exemplary embodiment of the present subject matter with doors of the example refrigerator appliance shown closed.

Repeat use of reference characters in the present specification and drawings is intended to represent the same or analogous features or elements of the present invention.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Figure 2:
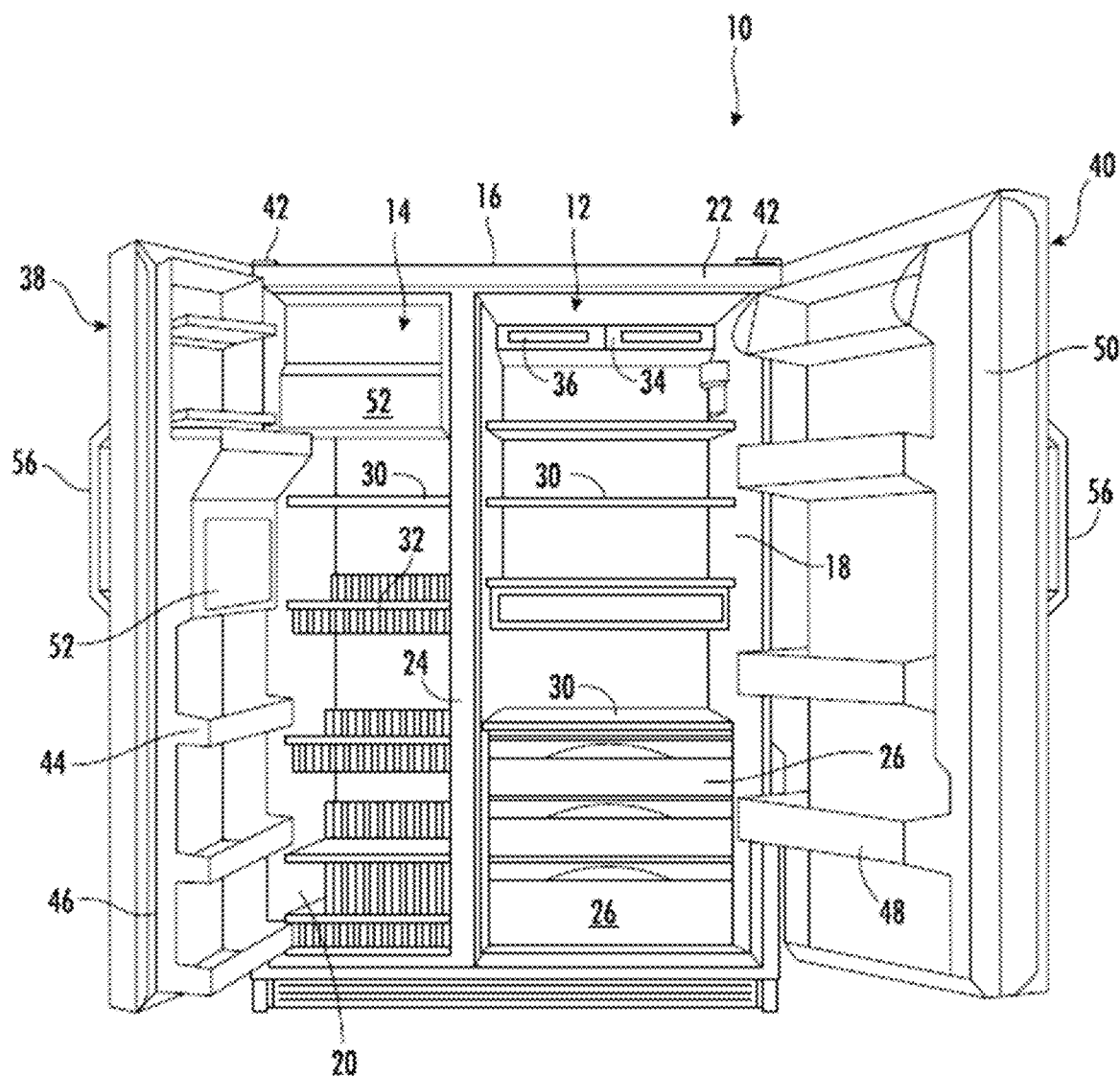
FIG. 2 is a perspective view of the exemplary refrigerator appliance with doors shown open.

FIG. 1 provides a perspective view of an exemplary appliance 10 according to an exemplary embodiment of the present subject matter. The exemplary appliance 10 of FIG. 1 is configured as a refrigerator appliance. FIG. 2 provides a perspective view of the appliance 10 with doors 38, 40 open to view refrigeration and freezer compartments 12, 14 formed within a cabinet or outer case 16. FIG. 1 provides a reference vertical direction V and width direction W.

Referring to FIG. 2, refrigerator appliance 10 includes the refrigeration compartment 12 and the freezer compartment 14, with the compartments arranged side-by-side and contained within the outer case 16. Outer case 16 and inner liners 18 and 20 are generally molded from a suitable plastic or foam material. For instance, the outer case may form a molded plastic or foam outer case. Thus, refrigerator appliance 10 is generally referred to as a side-by-side style refrigerator appliance. In alternative exemplary embodiments, refrigerator appliance 10 may include a single liner and a mullion that spans between opposite sides of the single liner to divide it into the freezer compartment 14, such as a compartment configured for frozen foods, and the refrigeration compartment 12, such as a compartment configured for fresh foods. Outer case 16 is normally formed by folding a sheet of a suitable material, such as pre-painted steel, into an inverted U-shape to form top and side walls of outer case 16.

A bottom wall of outer case 16 normally is formed separately and attached to the case side walls and to a bottom frame that provides support for refrigerator appliance 10. However, it should be appreciated that outer case 16 may be formed by other suitable manufacturing methods.

A breaker strip 22 extends between a case front flange and outer front edges of inner liners 18 and 20. Breaker strip 22 may be formed from a suitable resilient material, such as an extruded acrylo-butadiene-styrene based material (commonly referred to as ABS). The insulation in the space between inner liners 18 and 20 is covered by another strip of suitable resilient material, which also commonly is referred to as a mullion 24 and may be formed of an extruded ABS material. Breaker strip 22 and mullion 24 may form a front face, and extend completely around inner peripheral edges of outer case 16 and vertically between inner liners 18 and 20.

Slide-out drawers 26 and shelves 30 are normally provided in refrigeration compartment 12 to support items being stored therein. In addition, a shelf 30, a basket 32, or both, are generally provided in freezer compartment 14.

Refrigerator appliance features are regulated with a controller 34 according to user preference via manipulation of a control interface 36 mounted at refrigeration compartment 12 and coupled to controller 34. Input/output ("I/O") signals may be routed between controller 34 and various operational components of refrigerator appliance 10. The components of refrigerator appliance 10 may be in communication with controller 34 via one or more signal lines or shared communication busses.

Controller 34 can be any device that includes one or more processors and a memory. As an example, in some embodiments, controller 34 may include a single board computer (SBC). For example, controller 34 can be a single System-On-Chip (SOC). However, any form of controller 34 may also be used to perform the present subject matter. The processor(s) can be any suitable processing device, such as a microprocessor, microcontroller, integrated circuit, or other suitable processing devices or combinations thereof. The memory can include any suitable storage media, including, but not limited to, non-transitory computer-readable media, RAM, ROM, hard drives, flash drives, accessible databases, or other memory devices. The memory can store information accessible by processor(s), including instructions that can be executed by processor(s) to perform aspects of the present disclosure.

It should be appreciated that embodiments of the appliance 10 including the controller 34 may include operable and communicative coupling via a wired or wireless bus as may generally be understood in the art. Schematic depictions of the controller 34 should be understood to include busses, conduits, transmitters, wires, antennas, or other devices and structures generally understood for electrical or electronic between such devices.

Referring to FIGS. 1-2, a freezer door 38 and a fresh food door 40 close access openings to freezer compartment 14 and refrigeration compartment 12. Freezer door and fresh food door 38 and 40 are each mounted by a top hinge 42 and a bottom hinge (not shown) to rotate about its outer vertical edge between an open position, as shown in FIG. 1, and a closed position. Freezer door 38 may include a plurality of storage shelves 44 and a sealing gasket 46, and fresh food door 40 also includes a plurality of storage shelves 48 and a sealing gasket 50.

Freezer compartment 14 may include an automatic ice maker 52 and a dispenser assembly 54 provided in freezer door 38 such that ice and/or chilled water can be dispensed without opening freezer door 38, as is well known in the art. Freezer door and fresh food door 38 and 40 may be opened by handles 56. It should be appreciated that the dispenser assembly 54 may be positioned at an exterior portion of the door, such as depicted in FIG. 1, or positioned in an interior portion, such as to require opening the door to access the dispenser assembly 54.

Refrigerator appliance 10 also includes a machinery compartment (not shown) that at least partially contains a cooling system including components for executing a known vapor compression cycle for cooling air. For instance, FIGS. 3-4 may generally schematically depict components for cooling air at the refrigerator appliance 10. The cooling system may include a compressor, a condenser, an expansion device, and an evaporator connected in series as a loop and charged with a refrigerant. The evaporator is a type of heat exchanger which transfers heat from air passing over the evaporator to the refrigerant flowing through the evaporator, thereby causing the refrigerant to vaporize. The cooled air is used to refrigerate one or more refrigerator or freezer compartments via fans. Also, a cooling loop can be added to directly cool the ice maker to form ice cubes, and a heating loop can be added to help remove ice from the ice maker. Collectively, the vapor compression cycle components in a refrigeration circuit, associated fans, and associated compartments are conventionally referred to as a sealed system. The construction and operation of the sealed system are well known to those skilled in the art.

It should be appreciated that embodiments of the appliance 10 depicted and described in regard to FIGS. 1-2 are provided by way of example only. Embodiments of the system and method further depicted and described herein in regard to FIGS. 3-7 can be applied to other embodiments of refrigerator appliance, such as, but not limited to, top-bottom arrangements, freezer appliances, refrigeration appliances, beverage cooler appliances, or ice-making appliances, etc. Furthermore, embodiments depicted and described herein may be applied to other appliances, such as, but not limited to, dishwasher appliances, washing/drying machine appliances, or other household appliances including articulatable or actuatable components that may be selectively activated and de-activated (e.g., fans, fluid flow devices or valves, heating elements, cooling systems, etc.).

Figure 3:
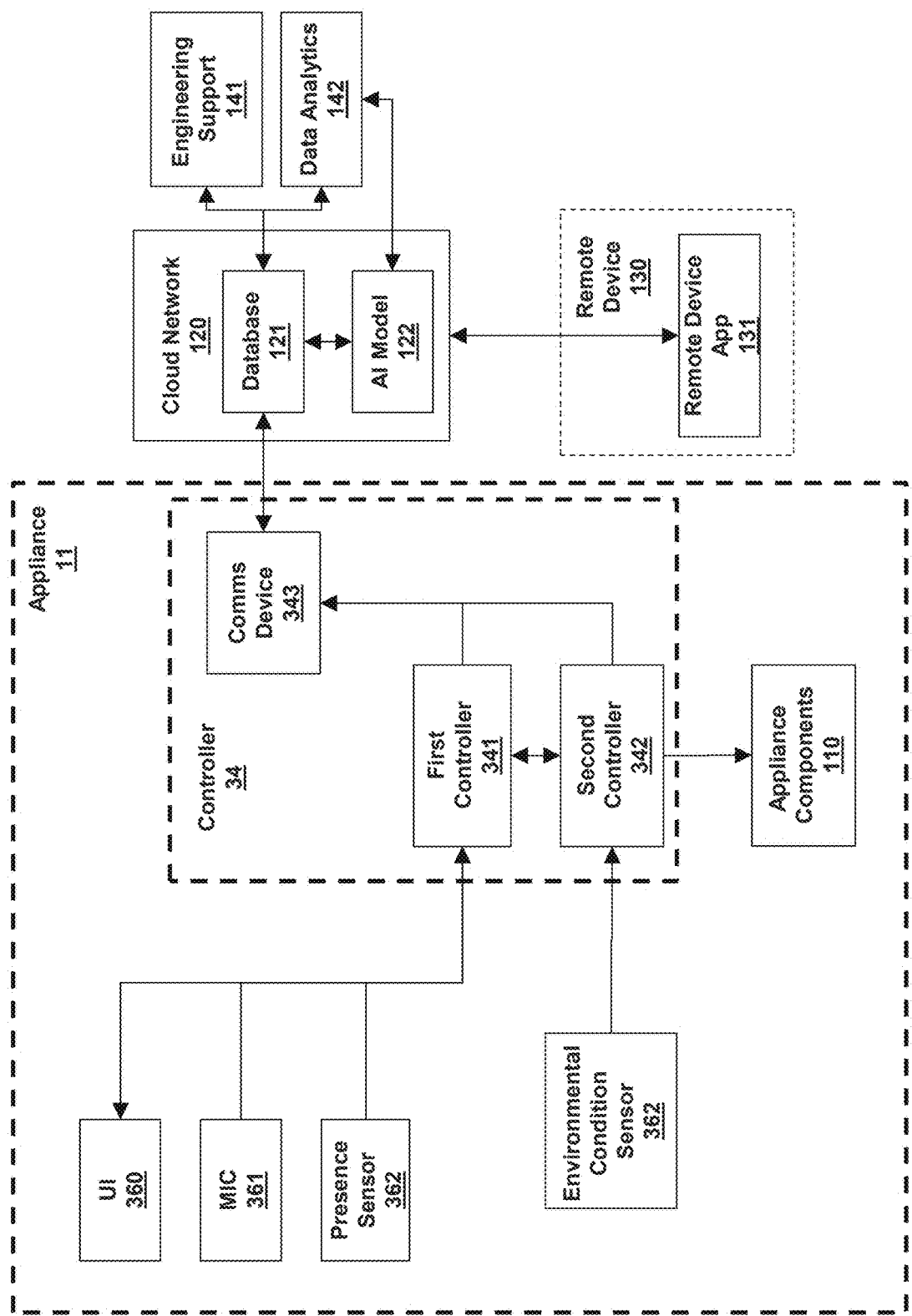
FIG. 3 provides a schematic diagram of a system for appliance self-diagnostics in accordance with aspects of the present disclosure.
Figure 4:
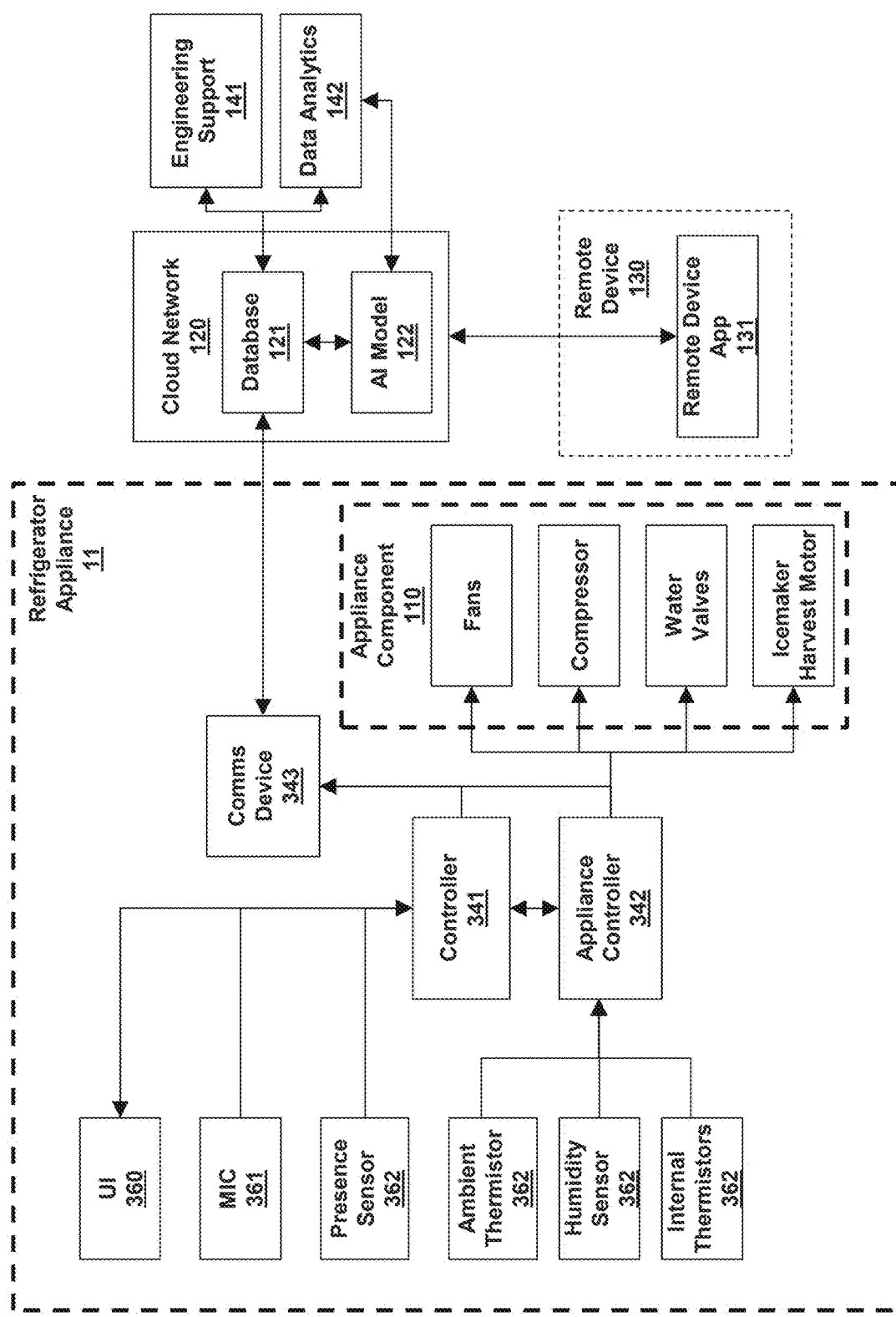
FIG. 4 provides a schematic diagram of a system for refrigerator appliance self-diagnostics in accordance with aspects of the present disclosure.

Referring now to FIGS. 3-4, schematic depictions of a self-diagnostics system 100 for an appliance 11 are provided. Embodiments of the appliance 11 may be configured as any suitable appliance, such as embodiments of the refrigerator appliance 10 depicted and described herein, or other household appliances such as described herein.

Embodiments of the system 100 including the appliance 11 include appliance components 110 that may be selectively activated and de-activated. For instance, referring to FIG. 4, the appliance 11 may include a plurality of appliance components 110 including one or more fans, compressors, fluid flow devices or valves, motors, or other mechanically-driven and/or electrically-driven components. Referring to FIGS. 3-4, the appliance components 110 are communicatively coupled to the controller 34, such as to receive signals to selectively command operation (e.g., command on/off, one or more speeds or positions, load settings, etc.).

A controller interface 360, such as a user interface as described in regard to control interface 36, is communicatively coupled to the controller 34 to receive user inputs (e.g., via buttons, knobs, switches, audio/visual commands, etc.), or furthermore, to receive and communicate messages to the user (e.g., audio and/or visual messages, such as status messages, operational states, diagnostics messages, etc.).

A microphone device (MIC) or acoustic sensor 361 is communicatively coupled to transmit signals to the controller 34. The acoustic sensor 361 may include any appropriate device configured to convert sound into electrical energy that can be utilized to generate a spectrogram, such as described herein. The acoustic sensor 361 is configured to monitor and record acoustic signals from the appliance 10 and areas surrounding the appliance 10.

In various embodiments, the controller 34 includes a first controller 341 configured to receive signals from one or more sensors 362, the acoustic sensor 361, and the controller interface 360. The controller 341 may be configured to transmit signals to the control interface 360. The sensors 362 may include a proximity or presence sensor configured to determine a presence or proximity of a user or object at the appliance 10. For instance, sensors 362 may include an ultrasonic sensor, a Hall Effect sensor, a capacitance device, a light sensor, a motion sensor, a camera, or other appropriate device for detecting whether a user or object is positioned within a threshold distance of the appliance.

The sensors 362 may include one or more environmental sensors configured to determine a temperature, humidity, pressure, or other physical characteristic of air, water or fluid generally, or surface at the appliance 10. For instance, The sensor 362 including a humidity sensor may be communicatively coupled to the controller 34 (e.g., an appliance controller) to transmit a signal corresponding to humidity at the refrigeration compartment 14, the freezer compartment 16, or other compartments or internal volumes at the appliance 10. Additionally, or alternatively, the sensor 362 including a temperature sensor (e.g., a thermistor) may be communicatively coupled to the controller 34 (e.g., an appliance controller) to transmit a signal corresponding to temperature at the refrigeration compartment 14, the freezer compartment 16, or other compartments or internal volumes at the appliance 10. The sensors 362 may include various devices configured to determine a door status (e.g., open or closed), a timer recording various conditions, or temperatures and operational states at the appliance components 110.

The controller 34 may include a second controller 342 forming an appliance controller configured to receive signals corresponding to environmental condition (e.g., from sensors 362), or positions or operational states of appliance components 110.

One or more acoustic sensors 361 is positioned at the appliance 11 to monitor and obtain (e.g., record) acoustic signals relative to the appliance components 110. For instance, the acoustic sensor 361 is configured to monitor and record acoustic signals relative to the appliance components 110 forming a fan, compressor, icemaker motor during ice harvest, ice dropping during harvest, or water valves.

Acoustic sensor(s) 361 and sensors 362 may be positioned at the appliance 11 to determine acoustic levels, temperature, or humidity outside of the appliance 11 to monitor (e.g., record acoustic signals) an environment external to the appliance 11. Acoustic sensor(s) 361 and sensors 362 may be positioned inside the appliance 11 to monitor an environment internal to the appliance (e.g., refrigeration compartment 14, freezer compartment 16, evaporators, ice compartments, icemaker, ice tray, fresh foods compartments, etc.).

The appliance controller may be configured to periodically or continuously receive, monitor, and obtain data on operation of the appliance 11, such as based on signals obtained from the acoustic sensor 361 and sensors 362. The data may correspond to set and actual temperatures at appliance components 110 or compartments (e.g., compartments 14, 16), operational states of appliance components 110 (e.g., on/off state, rotational speed, actuation, energized state, ice harvest time, defrost status, etc.).

Embodiments of the controller 34 may include a communications device (comms device) 343 configured to receive and transmit signals such as described herein (or data packets corresponding thereto) through a computing network 120. The communications device 343 may include any desired wired or wireless communications device, such as, but not limited to, short range or long range electromagnetic signals (e.g., Wi-Fi, Bluetooth, Zigbee, etc.), network cables, modems, etc. The computing network 120 may include a database 121 and artificial intelligence model(s) 122 configured to receive, process, store, transform, compare, or calculate based on steps of a method for appliance self-diagnostics (hereinafter, "method 1000"), such as further described herein.

The controller 34 is configured to receive or obtain the acoustic signal and process the acoustic signal from the acoustic sensor 361. For instance, the acoustic signal may be processed using a Fast Fourier Transform (FFT) to convert the acoustic signal to a spectrogram that represents magnitude in the frequency domain. The spectrogram provides a frequency spectrum of a vibrating component, such as appliance components 110.

The controller 34, the cloud network 120 (e.g., database 121), or remote device 130, may store a baseline spectrogram corresponding to one or more appliance components 110, or pluralities thereof. For instance, the baseline spectrogram may correspond to the appliance component 110 in a normal operating condition, or corresponding to a plurality of operating modes in a normal operating condition.

Data obtained from the appliance 11 can be stored at the controller 34 or database 121. Data may include date and time of data acquisition, a component name or identification associated with the data (e.g., one or more of appliance component 110), operating conditions (e.g., rotational speed, valve percentage open/closed, voltage/current value, pressure, etc.), and environmental or ambient conditions (e.g., temperature, humidity, acoustics, etc.). Associated data may be tagged or attached to the generated spectrograms, such as to provide operating conditions, environmental conditions, components names, date/time, etc. associated with the generated spectrograms.

The system 100 compares spectrograms corresponding to an operating condition over time to determine whether or how operating condition has changed over the period of time. For instance, the controller 34, an artificial intelligence model (AI model) 122, a remote device application 131, an engineering support resource 141, or data analytics resource 142, may compare a spectrogram obtained from acoustic signals from the acoustic sensor 361 (e.g., current-state spectrogram) to a baseline spectrogram stored at the controller 34, the cloud network 120, remote device 130, or an engineering support resource 141, or data analytics resource 142. As such, spectrogram range and intervals associated with a normal or baseline operating condition can be compared against a spectrogram corresponding to a current operating condition.

The data analytics resource 142 may include a computing module configured to compare the spectrograms and determine abnormal or undesired operation. Additionally, or alternatively, AI model 122 may be trained and utilized for monitoring operation of the appliance 11 to predict component failure, malfunction, or degradation, such as by comparing current and baseline spectrograms. Resources 141, 142, remote device application 131, or AI model 122 may generate and transmit a diagnosis and/or maintenance signal to the user (e.g., via comms device 343, controllers 341, 342, and controller interface 360 or remote device 130). The signal may recommend preventive maintenance, component repair or replacement, or operational setting change to prevent component degradation or failure.

For instance, the diagnosis and/or maintenance signal may be generated and transmitted by providing a visual and/or audio signal at the controller interface 360, the remote device 130, or both. The signal may include a fault code, a maintenance or operation instruction, or an operational change or adjustment at the appliance 11.

In some embodiments, the method for self-diagnostics may commence following a service request by a user or automatically following determination of abnormal operation of one or more appliance components 110 at the appliance 11.

Figure 5:
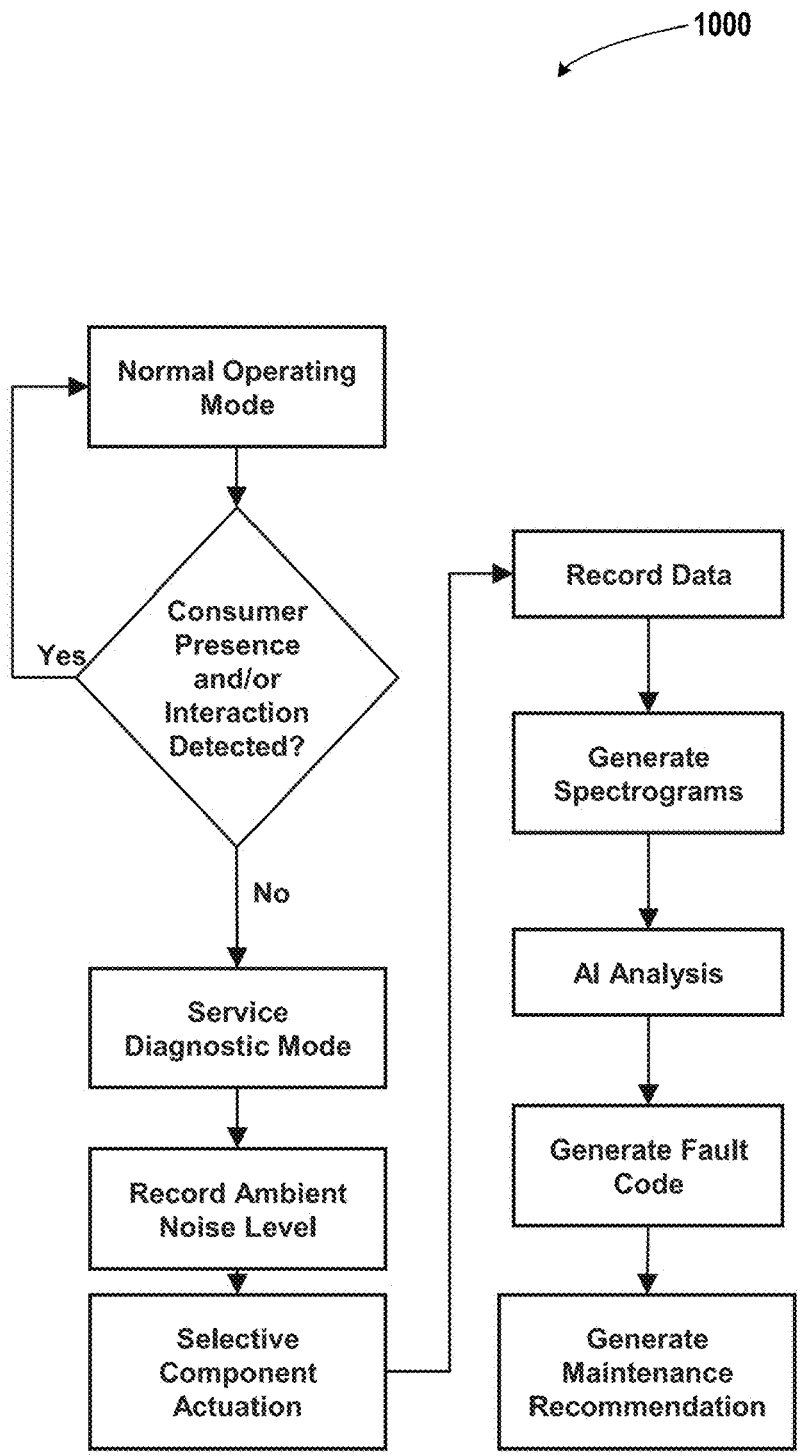
FIG. 5 provides a flowchart outlining steps of a method for appliance self-diagnostics in accordance with aspects of the present disclosure.
Figure 6:
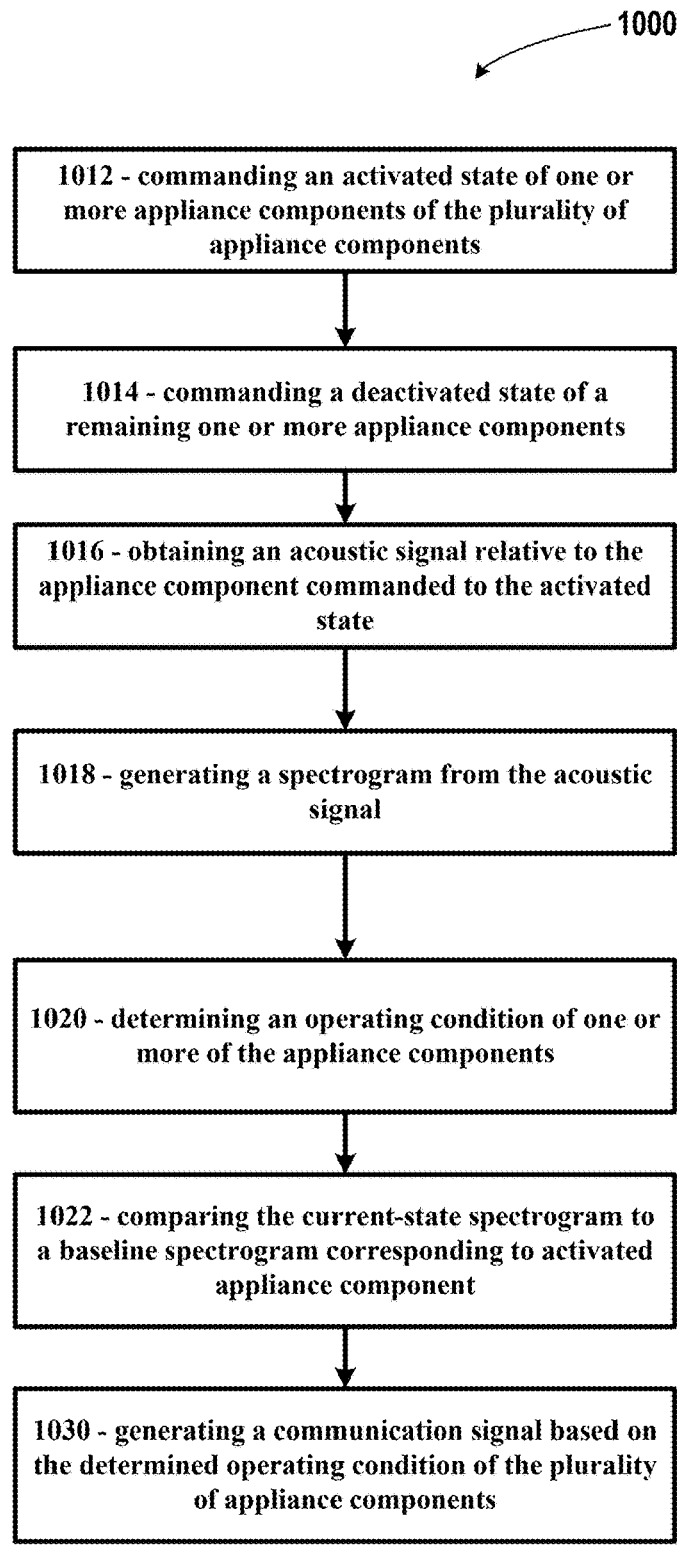
FIG. 6 provides a flowchart outlining steps of a method for appliance self-diagnostics in accordance with aspects of the present disclosure.
Figure 7:
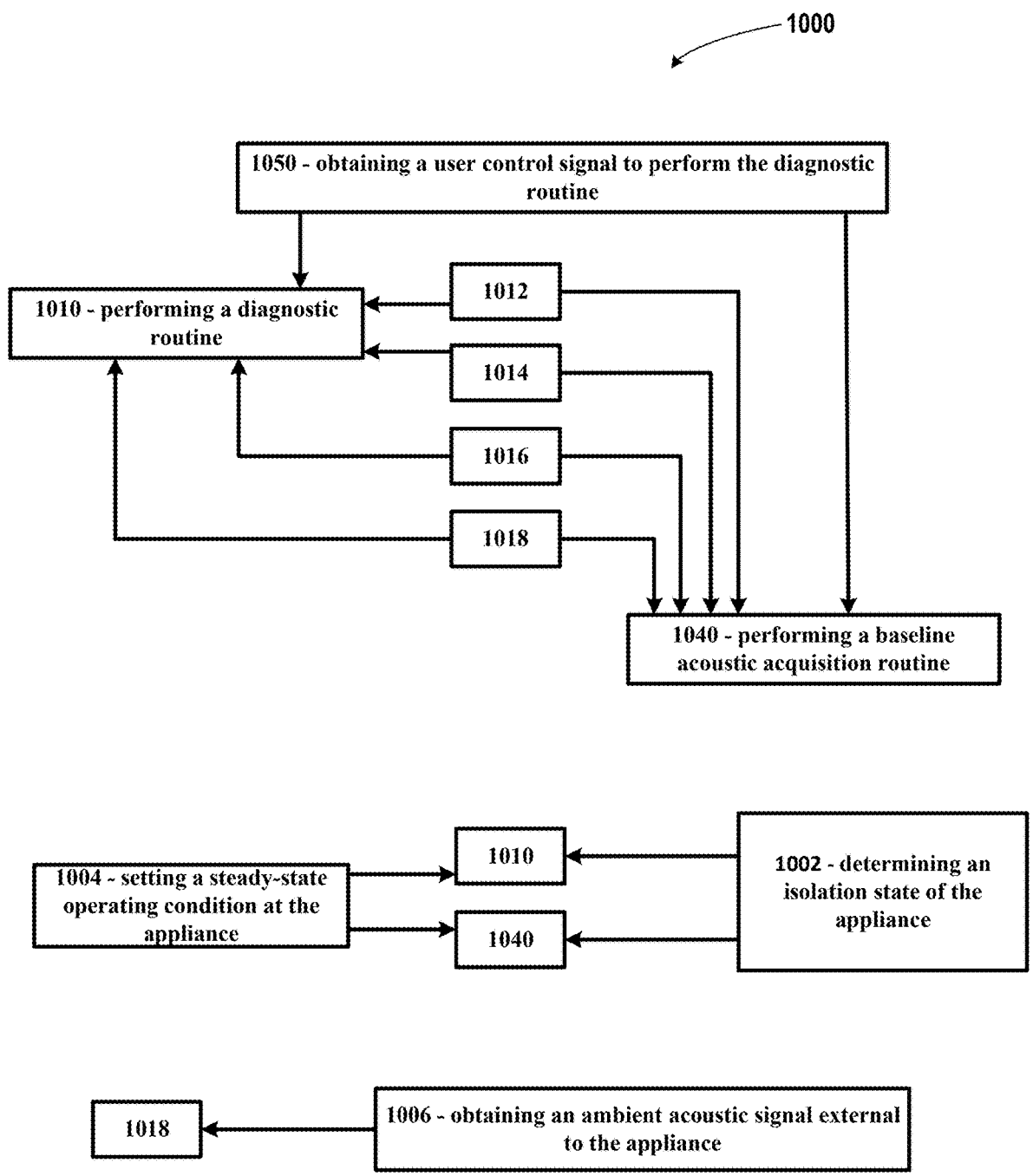
FIG. 7 provides a flowchart outlining steps of a method for appliance self-diagnostics in accordance with aspects of the present disclosure.

Referring now to FIGS. 5-7, flowcharts outlining steps of the method 1000 are provided. Embodiments of the method 1000 may be performed at a refrigeration appliance, such as appliance 10, or at an appliance generally, such as schematically depicted in regard to appliance 11, or system 100. It should be appreciated that steps of the method 1000 may be stored and executed locally at an appliance controller (e.g., controller 34), at a remote computing device (e.g., computing network 120, remote device 130, etc.), or combinations thereof. Embodiments of method 1000 may form a computer-implemented method including steps or instructions performed at one or more computing devices, such as, but not limited to, a controller, a computing network, a remote device, or combinations thereof. Computing devices may include, but are not limited to, personal computing devices, smartphones, tablets, servers, or other electronic devices generally including one or more processors, memory devices, wired and/or wireless communications devices, etc., or combinations thereof.

In some embodiments, method 1000 includes at 1002 determining an isolation state of the appliance. Determining the isolation state of the appliance may include determining user proximity to the appliance. Determining proximity may be based on obtaining a user acoustic signal from an acoustic sensor (e.g., acoustic sensor 361) or obtaining a proximity signal from a sensor (e.g., sensor 362), or both. In still some embodiments, determining user proximity to the appliance may include determining user interaction at the appliance. User interaction may include a door ajar signal (e.g., one or both of doors 38, 40 being open), receiving user control or input signals (e.g., via control interface 36), obtaining a user acoustic signal (e.g., via an acoustic sensor 361), or other user actuations at the appliance.

In various embodiments, method 1000 may include at 1004 setting a steady-state operating condition at the appliance. Setting the steady-state operating condition at the appliance may include setting an internal temperature at the appliance over a period of time (e.g., at compartments 12, 14), such as may correspond to a normal operating mode. For instance, setting the internal temperature may correspond to a freezing temperature at the freezer compartment 14 or a cooling temperature at the refrigeration compartment 12. The method 1000 may include obtaining a temperature signal, such as via a temperature sensor (e.g., sensor 362, such as an internal thermistor). Method 1000 may compare the internal temperature to a threshold environmental temperature at the appliance. The internal temperature at or above the threshold environmental temperature may correspond to the appliance being de-energized (e.g., unplugged or power outage) for a period of time such that the internal temperature rises substantially (e.g., to room temperature or greater). In some embodiments, setting the steady-state operating condition at the appliance is performed after a de-energized state of the appliance, or furthermore, after obtaining the temperature signal greater than the threshold environmental temperature. As such, exceeding the threshold environmental temperature may correspond to a de-energized state greater than a temporary power outage or other relatively short-term interruption to power supply at the appliance. Such threshold may correspond to initial installation of the appliance, moving the appliance to another facility or home, or following a maintenance or replacement task.

In various embodiments, method 1000 includes at 1012 commanding an activated state of one or more appliance components of the plurality of appliance components and at 1014 commanding a deactivated state of a remaining one or more appliance components. Steps 1012 and 1014 allow for isolating various appliance components (e.g., appliance component 110, such as described herein) and operating the components individually, or in various subsets or groups. Method 1000 includes at 1016 obtaining an acoustic signal relative to the appliance component(s) commanded to the activated state. Steps 1012, 1014, 1016 allow for obtaining an acoustic signal relative to individual appliance components, or subsets or groups thereof. Method 1000 includes at 1018 generating a spectrogram from the acoustic signal (e.g., based on a Fast Fourier Transform or other appropriate method).

For instance, the system commands a fan to operate and other components are commanded to deactivate. The system obtains the acoustic signal corresponding to the fan and generates a spectrogram relative to the fan. The system commands deactivation of the fan and other components and commands activation of the compressor. The system obtains the acoustic signal corresponding to the compressor and generates a spectrogram relative to the compressor. The system may continue until various components have been isolated and corresponding acoustic signals are obtained and spectrograms are generated.

As such, in various embodiments, method 1000 includes cycling the plurality of appliance components between the activated state and the deactivated step, such as to iteratively perform method 1000 at 1012, 1014, 1016, and 1018, to obtain acoustic signals corresponding to individual appliance components, or subsets or groups of appliance components, and generate corresponding spectrograms.

In various embodiments, method 1000 includes at 1010 performing a diagnostic routine including steps 1012 and 1014. The diagnostic routine may further include steps 1016 and 1018, such that the diagnostic routine generates a current-state acoustic signal and current-state spectrogram corresponding to each appliance component, or subsets or groups of appliance components thereof.

In various embodiments, method 1000 includes at 1020 determining an operating condition of one or more of the appliance components. Determining the operating condition may include determining whether the appliance component is operating in a normal condition, a malfunctioning condition, or inoperable. For instance, the appliance component may be commanded to operate and fail to operate, or fail to obtain a required operating condition. The obtained acoustic signal may correspond to an absence of sound (e.g., non-operating), or generate a signal substantially different from a baseline condition (e.g., a normal operating condition). For instance, the acoustic signal corresponding to the operating condition may correspond to an appliance component (e.g., appliance component 110) speed, frequency, amplitude, magnitude, etc. Additionally, as described herein, data corresponding to the acoustic signal may further include component identifiers, time/date, periods of time, etc.

Method 1000 at 1020 may include at 1022 comparing the current-state spectrogram (e.g., generated at 1018) to a baseline spectrogram corresponding to activated appliance component. Comparing the current-state spectrogram to the baseline spectrogram may include determining whether the current-state spectrogram exceeds a similarity threshold relative to the baseline spectrogram for a corresponding activated component. In some embodiments, resources 141, 142, remote device application 131, or AI model 122 may obtain the acoustic signals or spectrograms and perform step 1022 to compare the current-state to the baseline to determine a similarity or dissimilarity.

In various embodiments, determining the isolation state (at 1002) is performed after setting the steady-state operating condition (at 1004). The method 1000 may further perform the diagnostic routine (at 1010) after the isolation state is determined. For instance, after determining that the appliance is isolated from various environmental noises or user inputs and interactions, the diagnostic routine may obtain acoustic signals while reducing or minimizing acquisition of noise separate from the activated appliance component (e.g., noise relative to user interaction, ambient noises, etc.). If the isolation state is non-determined, or insufficient, method 1000 may include a waiting period before determining the isolation state again before performing the diagnostic routine.

In some embodiments, method 1000 includes at 1006 obtaining an ambient acoustic signal external to the appliance. The ambient acoustic signal may be utilized to deduct ambient noise from the current-state or baseline acoustic signals and corresponding spectrograms. In various embodiments, method 1000 at 1018 may include deducting the ambient acoustic signal, or data corresponding thereto, from the current-state acoustic signal or baseline acoustic signal.

In various embodiments, method 1000 includes at 1030 generating a communication signal based on the determined operating condition of the plurality of appliance components. The communication signal may include an audio and/or visual signal indicating whether one or more of the appliance components is operating according to the normal operating condition (e.g., the comparison of the current-state and baseline spectrograms is similar), or whether the appliance component is in an abnormal or non-functioning operating condition (e.g., the comparison of the current-state and baseline spectrograms are dissimilar). As such, the diagnostic routine may facilitate the user determining whether a particular appliance component is defective. A diagnosis or maintenance signal may be transmitted to a service provider, such as may allow for acquisition of appropriate repair or replacement components, or determine trends relative to the operating conditions, data, and defective appliance component.

Various embodiments of the method 1000 may include at 1040 performing a baseline acoustic acquisition routine based on steps 1012, 1014, 1016, and 1018. In some embodiments, method 1000 at 1040 is further based on steps 1002 and 1004. As such, method 1000 at 1040 may include setting a steady-state operating condition at the appliance, determining an isolation state of the appliance, commanding an activated state of one or more appliance components of the plurality of appliance components after the isolation state is determined, commanding a deactivated state of a remaining one or more appliance components, obtaining a baseline acoustic signal relative to the plurality of appliance components commanded to the activated state, and generating a baseline spectrogram from the baseline acoustic signal. In still various embodiments, method 1000 at 1040 includes cycling activation and deactivation such as described herein to generate a baseline spectrogram relative to each baseline acoustic signal relative to individual appliance components, or subsets or groups thereof.

Embodiments of the method 1000 may include at 1050 obtaining a user control signal to perform the diagnostic routine at 1010. As such, embodiments of the method 1000 may include a user-activated self-diagnostic routine.

In still some embodiments, method 1000 may be performed routinely, such as over a pre-determined period of time. Routine performance of the method 1000 may form a preventative maintenance routine. For instance, signals may be generated and transmitted to resources 141, 142, 122 on a periodic basis. Communication signals may be generated and transmitted to the user (e.g., at 1030), such as may recommend a maintenance operation, a change in appliance operation, or scheduling a maintenance visit by a service provider. In still various embodiments, the communication signal generated at 1030 may include a control signal to change an operating parameter at the appliance component, such as to facilitate operation in the current condition of appliance component, or until a service provider can address an issue.

Further aspects of the present disclosure are provided in one or more of the following clauses:

1. An appliance, including a plurality of appliance components; an acoustic sensor configured to obtain an acoustic signal relative to the plurality of appliance components; a controller operably coupled to the plurality of appliance components and configured to receive the acoustic signal from the acoustic sensor, the controller configured to execute instructions that causes the appliance to perform operations, the operations including determining an isolation state of the appliance; performing a diagnostic routine after the isolation state is determined, wherein the diagnostic routine commands an activated state of one or more appliance components of the plurality of appliance components, and wherein the diagnostic routine commands a deactivated state of a remaining one or more appliance components; obtaining the acoustic signal relative to the plurality of appliance components commanded to the activated state; generating a current-state spectrogram from the acoustic signal; determining an operating condition of the plurality of appliance components commanded to the activated state based at least on comparing the current-state spectrogram to a baseline spectrogram corresponding to activated appliance component; and generating a communication signal based on the determined operating condition of the plurality of appliance components.

2. The appliance of any one or more clauses herein, wherein the diagnostic routine cycles the plurality of appliance components between the activated state and the deactivated state.

3. The appliance of any one or more clauses herein, wherein obtaining the acoustic signal relative to the plurality of appliance components commanded to the activated state includes obtaining a plurality acoustic signals each corresponding to each one or more of the plurality of appliance components cycled to the activated state.

4. The appliance of any one or more clauses herein, wherein comparing the current-state spectrogram to the baseline spectrogram corresponding to activated appliance component includes determining the current-state spectrogram exceeding a similarity threshold relative to the baseline spectrogram for a corresponding activated component.

5. The appliance of any one or more clauses herein, wherein generating the current-state spectrogram from the acoustic signal includes generating the current-state spectrogram based on a Fast Fourier Transform.

6. The appliance of any one or more clauses herein, wherein determining the isolation state of the appliance includes determining proximity to the appliance based at least on the acoustic sensor.

7. The appliance of any one or more clauses herein, wherein the controller includes a communications device configured to transmit and receive signals from a remote computing device.

8. A system for appliance diagnostics, the system including an appliance including a plurality of appliance components, an acoustic sensor, a proximity sensor, and a controller, wherein the acoustic sensor is configured to obtain an acoustic signal relative to the plurality of appliance components, and wherein the controller is operably coupled to the plurality of appliance components, the controller including a communications device configured to transmit and receive signals from the remote computing device, the controller configured to receive the acoustic signal from the acoustic sensor; and a remote computing device configured to communicatively couple to the appliance, wherein the controller and the remote computing device includes instructions that, when executed, causes the appliance and the remote computing device to perform operations, the operations including determining, via the proximity sensor or the acoustic sensor, an isolation state of the appliance; performing, at the appliance, a diagnostic routine after the isolation state is determined, wherein the diagnostic routine commands an activated state of one or more appliance components of the plurality of appliance components, and wherein the diagnostic routine commands a deactivated state of a remaining one or more appliance components; obtaining, via the acoustic sensor, the acoustic signal relative to the plurality of appliance components commanded to the activated state; transmitting, via the controller to the remote computing device, the acoustic signal; generating, via the remote computing device, a current-state spectrogram based on the acoustic signal; determining, via the remote computing device, an operating condition of the plurality of appliance components commanded to the activated state based at least on comparing the current-state spectrogram to a baseline spectrogram corresponding to activated appliance component; and transmitting, from the remote computing device to the appliance, a communication signal based on the determined operating condition of the plurality of appliance components.

9. The system of any one or more clauses herein, wherein the diagnostic routine cycles the plurality of appliance components between the activated state and the deactivated state.

10. The system of any one or more clauses herein, wherein obtaining the acoustic signal relative to the plurality of appliance components commanded to the activated state includes obtaining a plurality acoustic signals each corresponding to each one or more of the plurality of appliance components cycled to the activated state.

11. The system of any one or more clauses herein, wherein comparing the current-state spectrogram to the baseline spectrogram corresponding to activated appliance component includes determining the current-state spectrogram exceeding a similarity threshold relative to the baseline spectrogram for a corresponding activated component.

12. The system of any one or more clauses herein, wherein generating the current-state spectrogram from the acoustic signal includes generating the current-state spectrogram based on a Fast Fourier Transform.

13. The system of any one or more clauses herein, wherein determining the isolation state of the appliance includes determining proximity to the appliance based at least on the proximity sensor.

14. The system of any one or more clauses herein, wherein determining the operating condition includes comparing, via an artificial intelligence model, the current-state spectrogram to the baseline spectrogram corresponding to activated appliance component.

15. A computer-implemented method for appliance diagnostics, the method including: determining an isolation state of the appliance; performing a diagnostic routine after the isolation state is determined, wherein the diagnostic routine commands an activated state of one or more appliance components of the plurality of appliance components, and wherein the diagnostic routine commands a deactivated state of a remaining one or more appliance components; obtaining an acoustic signal relative to a plurality of appliance components commanded to the activated state; generating a current-state spectrogram based on the acoustic signal; determining an operating condition of the plurality of appliance components commanded to the activated state based at least on comparing the current-state spectrogram to a baseline spectrogram corresponding to activated appliance component; and transmitting a communication signal based on the determined operating condition of the plurality of appliance components.

16. The computer-implemented method of any one or more clauses herein, wherein the diagnostic routine cycles the plurality of appliance components between the activated state and the deactivated state.

17. The computer-implemented method of any one or more clauses herein, wherein obtaining the acoustic signal relative to the plurality of appliance components commanded to the activated state includes obtaining a plurality acoustic signals each corresponding to each one or more of the plurality of appliance components cycled to the activated state.

18. The computer-implemented method of any one or more clauses herein, wherein comparing the current-state spectrogram to the baseline spectrogram corresponding to activated appliance component includes determining the current-state spectrogram exceeding a similarity threshold relative to the baseline spectrogram for a corresponding activated component.

19. The computer-implemented method of any one or more clauses herein, wherein generating the current-state spectrogram from the acoustic signal includes generating the current-state spectrogram based on a Fast Fourier Transform.

20. The computer-implemented method of any one or more clauses herein, wherein determining the isolation state of the appliance includes determining proximity to the appliance on a proximity sensor, an acoustic sensor, or both.

21. An appliance, including a plurality of appliance components; an acoustic sensor configured to obtain an acoustic signal relative to the plurality of appliance components; a controller operably coupled to the plurality of appliance components and configured to receive the acoustic signal from the acoustic sensor, the controller configured to execute instructions that causes the appliance to perform operations, the operations including setting a steady-state operating condition at the appliance; determining an isolation state of the appliance; commanding an activated state of one or more appliance components of the plurality of appliance components after the isolation state is determined; commanding a deactivated state of a remaining one or more appliance components; obtaining a baseline acoustic signal relative to the plurality of appliance components commanded to the activated state; and generating a baseline spectrogram from the baseline acoustic signal.

22. The appliance of any one or more clauses herein, wherein determining the isolation state of the appliance is performed after setting the steady-state operating condition at the appliance.

23. The appliance of any one or more clauses herein, wherein determining the isolation state of the appliance includes determining user proximity to the appliance or user interaction at the appliance.

24. The appliance of any one or more clauses herein, wherein determining user interaction at the appliance includes receiving a user input signal, obtaining a user acoustic signal, or receiving a user actuation at the appliance.

25. The appliance of any one or more clauses herein, wherein the operations include cycling the plurality of appliance components between the activated state and the deactivated state and obtaining the baseline acoustic signal corresponding to each one or more of the plurality of appliance components cycled to the activated state.

26. The appliance of any one or more clauses herein, wherein the operations include generating a baseline spectrogram relative to each baseline acoustic signal obtained from cycling the plurality of appliance components between the activated state and the deactivated state.

27. The appliance of any one or more clauses herein, wherein setting the steady-state operating condition at the appliance is performed after a de-energized state of the appliance.

28. The appliance of any one or more clauses herein, wherein setting the steady-state operating condition at the appliance is performed after the de-energized state of the appliance and obtaining a temperature signal greater than a threshold environmental temperature at the appliance.

30. The appliance of any one or more clauses herein, the operations including performing a diagnostic routine after generating the baseline spectrogram, wherein performing the diagnostic routine includes obtaining a current-state spectrogram relative to one or more appliance components in the activated state and comparing the current-state spectrogram to the baseline spectrogram.

31. The appliance of any one or more clauses herein, wherein comparing the current-state spectrogram to the baseline spectrogram includes determining the current-state spectrogram exceeding a similarity threshold relative to the baseline spectrogram for a corresponding activated component.

32. The appliance of any one or more clauses herein, wherein generating the current-state spectrogram from the acoustic signal includes generating the current-state spectrogram based on a Fast Fourier Transform.

33. A system for appliance self-diagnostics, the system including an appliance including a plurality of appliance components, an acoustic sensor, a proximity sensor, and a controller, wherein the acoustic sensor is configured to obtain an acoustic signal relative to the plurality of appliance components, and wherein the controller is operably coupled to the plurality of appliance components, the controller including a communications device configured to transmit and receive signals from the remote computing device, the controller configured to receive the acoustic signal from the acoustic sensor; and a remote computing device configured to communicatively couple to the appliance, wherein the controller and the remote computing device includes instructions that, when executed, causes the appliance and the remote computing device to perform operations, the operations including setting a steady-state operating condition at the appliance; determining an isolation state of the appliance; commanding an activated state of one or more appliance components of the plurality of appliance components after the isolation state is determined; commanding a deactivated state of a remaining one or more appliance components; obtaining a baseline acoustic signal relative to the plurality of appliance components commanded to the activated state; transmitting, via the controller to the remote computing device, the baseline acoustic signal; and generating, via the remote computing device, a baseline spectrogram from the baseline acoustic signal.

34. The system of any one or more clauses herein, wherein determining the isolation state of the appliance is performed after setting the steady-state operating condition at the appliance.

35. The system of any one or more clauses herein, wherein the operations include cycling the plurality of appliance components between the activated state and the deactivated state and obtaining the baseline acoustic signal corresponding to each one or more of the plurality of appliance components cycled to the activated state.

36. The system of any one or more clauses herein, wherein the operations include generating a baseline spectrogram relative to each baseline acoustic signal obtained from cycling the plurality of appliance components between the activated state and the deactivated state.

37. The system of any one or more clauses herein, wherein setting the steady-state operating condition at the appliance is performed after a de-energized state of the appliance.

38. The appliance of any one or more clauses herein, wherein setting the steady-state operating condition at the appliance is performed after the de-energized state of the appliance and obtaining a temperature signal greater than a threshold environmental temperature at the appliance.

39. The system of any one or more clauses herein, the operations including performing a diagnostic routine after generating the baseline spectrogram, wherein performing the diagnostic routine includes obtaining a current-state spectrogram relative to one or more appliance components in the activated state and comparing the current-state spectrogram to the baseline spectrogram.

40. The system of any one or more clauses herein, wherein comparing the current-state spectrogram to the baseline spectrogram includes determining the current-state spectrogram exceeding a similarity threshold relative to the baseline spectrogram for a corresponding activated component.

41. An appliance, including a plurality of appliance components; an acoustic sensor configured to obtain an acoustic signal relative to the plurality of appliance components; a controller operably coupled to the plurality of appliance components and configured to receive the acoustic signal from the acoustic sensor, the controller configured to execute instructions that causes the appliance to perform operations, the operations including obtaining a user control signal to perform a diagnostic routine; obtaining an ambient acoustic signal external to the appliance; performing the diagnostic routine, wherein the diagnostic routine commands an activated state of one or more appliance components of the plurality of appliance components, and wherein the diagnostic routine commands a deactivated state of a remaining one or more appliance components; obtaining a current-state acoustic signal relative to the plurality of appliance components commanded to the activated state; generating a current-state spectrogram from the current-state acoustic signal; determining an operating condition of the plurality of appliance components commanded to the activated state based at least on comparing the current-state spectrogram to a baseline spectrogram corresponding to activated appliance component; and generating a communication signal based on the determined operating condition of the plurality of appliance components.

42. The appliance of any one or more clauses herein, wherein generating the current-state spectrogram includes deducting the ambient acoustic signal from the current-state acoustic signal.

43. The appliance of any one or more clauses herein, wherein the diagnostic routine cycles the plurality of appliance components between the activated state and the deactivated state.

44. The appliance of any one or more clauses herein, wherein obtaining the acoustic signal relative to the plurality of appliance components commanded to the activated state includes obtaining a plurality acoustic signals each corresponding to each one or more of the plurality of appliance components cycled to the activated state.

45. The appliance of any one or more clauses herein, wherein comparing the current-state spectrogram to the baseline spectrogram corresponding to activated appliance component includes determining the current-state spectrogram exceeding a similarity threshold relative to the baseline spectrogram for a corresponding activated component.

46. The appliance of any one or more clauses herein, wherein generating the current-state spectrogram from the acoustic signal includes generating the current-state spectrogram based on a Fast Fourier Transform.

47. The appliance of any one or more clauses herein, the operations including performing a baseline acoustic acquisition routine.
48. The appliance of any one or more clauses herein, wherein performing the baseline acoustic acquisition routine includes setting a steady-state operating condition at the appliance; determining an isolation state of the appliance; commanding an activated state of one or more appliance components of the plurality of appliance components after the isolation state is determined; commanding a deactivated state of a remaining one or more appliance components; obtaining a baseline acoustic signal relative to the plurality of appliance components commanded to the activated state; and generating a baseline spectrogram from the baseline acoustic signal.
49. The appliance of any one or more clauses herein, wherein the operations include cycling the plurality of appliance components between the activated state and the deactivated state and obtaining the baseline acoustic signal corresponding to each one or more of the plurality of appliance components cycled to the activated state.
50. The appliance of any one or more clauses herein, wherein the operations include generating a baseline spectrogram relative to each baseline acoustic signal obtained from cycling the plurality of appliance components between the activated state and the deactivated state.
51. The appliance of any one or more clauses herein, wherein setting the steady-state operating condition at the appliance is performed after a de-energized state of the appliance.
52. The appliance of any one or more clauses herein, wherein setting the steady-state operating condition at the appliance is performed after the de-energized state of the appliance and obtaining a temperature signal greater than a threshold environmental temperature at the appliance.
53. The appliance of any one or more clauses herein, the operations including determining an isolation state of the appliance, wherein performing the diagnostic routine is after determining the isolation state of the appliance.
54. The appliance of claim 13, wherein determining the isolation state of the appliance includes determining proximity to the appliance based at least on the acoustic sensor.
55. A computer-implemented method for appliance diagnostics, the method including obtaining a user control signal to perform a diagnostic routine; obtaining an ambient acoustic signal external to the appliance; performing the diagnostic routine, wherein the diagnostic routine commands an activated state of one or more appliance components of the plurality of appliance components, and wherein the diagnostic routine commands a deactivated state of a remaining one or more appliance components; obtaining a current-state acoustic signal relative to the plurality of appliance components commanded to the activated state; generating a current-state spectrogram from the current-state acoustic signal; determining an operating condition of the plurality of appliance components commanded to the activated state based at least on comparing the current-state spectrogram to a baseline spectrogram corresponding to activated appliance component; and generating a communication signal based on the determined operating condition of the plurality of appliance components.
56. The computer-implemented method of any one or more clauses herein, wherein generating the current-state spectrogram includes deducting the ambient acoustic signal from the current-state acoustic signal.
57. The computer-implemented method of any one or more clauses herein, including performing a baseline acoustic acquisition routine.
58. The computer-implemented method of any one or more clauses herein, wherein performing the baseline acoustic acquisition routine includes setting a steady-state operating condition at the appliance; determining an isolation state of the appliance; commanding an activated state of one or more appliance components of the plurality of appliance components after the isolation state is determined; commanding a deactivated state of a remaining one or more appliance components; obtaining a baseline acoustic signal relative to the plurality of appliance components commanded to the activated state; and generating a baseline spectrogram from the baseline acoustic signal.
59. The computer-implemented method of any one or more clauses herein, including cycling the plurality of appliance components between the activated state and the deactivated state and obtaining the baseline acoustic signal corresponding to each one or more of the plurality of appliance components cycled to the activated state.
60. The computer-implemented method of any one or more clauses herein, including generating a baseline spectrogram relative to each baseline acoustic signal obtained from cycling the plurality of appliance components between the activated state and the deactivated state.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. An appliance, comprising:
a plurality of appliance components;
an acoustic sensor configured to obtain an acoustic signal relative to the plurality of appliance components;
a controller operably coupled to the plurality of appliance components and configured to receive the acoustic signal from the acoustic sensor, the controller configured to execute instructions that causes the appliance to perform operations, the operations comprising:
obtaining a user control signal to perform a diagnostic routine;
obtaining an ambient acoustic signal external to the appliance;
performing the diagnostic routine, wherein the diagnostic routine commands an activated state of one or more appliance components of the plurality of appliance components, and wherein the diagnostic routine commands a deactivated state of a remaining one or more appliance components;

obtaining a current-state acoustic signal relative to the plurality of appliance components commanded to the activated state;

generating a current-state spectrogram from the current-state acoustic signal;

determining an operating condition of the plurality of appliance components commanded to the activated state based at least on comparing the current-state spectrogram to a baseline spectrogram corresponding to activated appliance component; and generating a communication signal based on the determined operating condition of the plurality of appliance components.

2. The appliance of claim 1, wherein generating the current-state spectrogram comprises deducting the ambient acoustic signal from the current-state acoustic signal.

3. The appliance of claim 1, wherein the diagnostic routine cycles the plurality of appliance components between the activated state and the deactivated state.

4. The appliance of claim 3, wherein obtaining the acoustic signal relative to the plurality of appliance components commanded to the activated state comprises obtaining a plurality acoustic signals each corresponding to each one or more of the plurality of appliance components cycled to the activated state.

5. The appliance of claim 1, wherein comparing the current-state spectrogram to the baseline spectrogram corresponding to activated appliance component comprises determining the current-state spectrogram exceeding a similarity threshold relative to the baseline spectrogram for a corresponding activated component.

6. The appliance of claim 1, wherein generating the current-state spectrogram from the acoustic signal comprises generating the current-state spectrogram based on a Fast Fourier Transform.

7. The appliance of claim 1, the operations comprising: performing a baseline acoustic acquisition routine.

8. The appliance of claim 7, wherein performing the baseline acoustic acquisition routine comprises:
   setting a steady-state operating condition at the appliance;
   determining an isolation state of the appliance;
   commanding an activated state of one or more appliance components of the plurality of appliance components after the isolation state is determined;
   commanding a deactivated state of a remaining one or more appliance components;
   obtaining a baseline acoustic signal relative to the plurality of appliance components commanded to the activated state; and
   generating a baseline spectrogram from the baseline acoustic signal.

9. The appliance of claim 8, wherein the operations comprise cycling the plurality of appliance components between the activated state and the deactivated state and obtaining the baseline acoustic signal corresponding to each one or more of the plurality of appliance components cycled to the activated state.

10. The appliance of claim 9, wherein the operations comprise generating a baseline spectrogram relative to each baseline acoustic signal obtained from cycling the plurality of appliance components between the activated state and the deactivated state.

11. The appliance of claim 8, wherein setting the steady-state operating condition at the appliance is performed after a de-energized state of the appliance.

12. The appliance of claim 11, wherein setting the steady-state operating condition at the appliance is performed after the de-energized state of the appliance and obtaining a temperature signal greater than a threshold environmental temperature at the appliance.

13. The appliance of claim 1, the operations comprising:
   determining an isolation state of the appliance, wherein performing the diagnostic routine is after determining the isolation state of the appliance.

14. The appliance of claim 13, wherein determining the isolation state of the appliance comprises determining proximity to the appliance based at least on the acoustic sensor.

15. A computer-implemented method for appliance diagnostics, the method comprising:
   obtaining a user control signal to perform a diagnostic routine;
   obtaining an ambient acoustic signal external to the appliance;
   performing the diagnostic routine, wherein the diagnostic routine commands an activated state of one or more appliance components of the plurality of appliance components, and wherein the diagnostic routine commands a deactivated state of a remaining one or more appliance components;
   obtaining a current-state acoustic signal relative to the plurality of appliance components commanded to the activated state;
   generating a current-state spectrogram from the current-state acoustic signal;
   determining an operating condition of the plurality of appliance components commanded to the activated state based at least on comparing the current-state spectrogram to a baseline spectrogram corresponding to activated appliance component; and
   generating a communication signal based on the determined operating condition of the plurality of appliance components.

16. The computer-implemented method of claim 15, wherein generating the current-state spectrogram comprises deducting the ambient acoustic signal from the current-state acoustic signal.

17. The computer-implemented method of claim 15, comprising:
   performing a baseline acoustic acquisition routine.

18. The computer-implemented method of claim 17, wherein performing the baseline acoustic acquisition routine comprises:
   setting a steady-state operating condition at the appliance;
   determining an isolation state of the appliance;
   commanding an activated state of one or more appliance components of the plurality of appliance components after the isolation state is determined;
   commanding a deactivated state of a remaining one or more appliance components;
   obtaining a baseline acoustic signal relative to the plurality of appliance components commanded to the activated state; and
   generating a baseline spectrogram from the baseline acoustic signal.

19. The computer-implemented method of claim 18, comprising:
   cycling the plurality of appliance components between the activated state and the deactivated state and obtaining the baseline acoustic signal corresponding to each one or more of the plurality of appliance components cycled to the activated state.

20. The computer-implemented method of claim 19, comprising:

generating a baseline spectrogram relative to each baseline acoustic signal obtained from cycling the plurality of appliance components between the activated state and the deactivated state.

\* \* \* \* \*